United States Patent
Monfared et al.

(10) Patent No.: US 11,988,466 B2
(45) Date of Patent: May 21, 2024

(54) WATER HEATER BYPASS VALVES AND DEVICES THERETO

(71) Applicant: Rheem Manufacturing Company, Atlanta, GA (US)

(72) Inventors: Amin Monfared, Oxnard, CA (US); Juan Garcia, Oxnard, CA (US); Juan Carlos Montanez, Oxnard, CA (US); Satya Kiran Gullapalli, Oxnard, CA (US); Alexander Chow, Oxnard, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 537 days.

(21) Appl. No.: 17/318,052

(22) Filed: May 12, 2021

(65) Prior Publication Data
US 2022/0364805 A1    Nov. 17, 2022

(51) Int. Cl.
*F16K 17/04* (2006.01)
*F28F 27/02* (2006.01)
*F28D 1/053* (2006.01)

(52) U.S. Cl.
CPC ............. *F28F 27/02* (2013.01); *F16K 17/04* (2013.01); *F16K 2200/30* (2021.08); *F28D 1/05366* (2013.01); *F28F 2250/06* (2013.01)

(58) Field of Classification Search
CPC ....... F28F 27/02; F28F 2250/06; F16K 17/04; F16K 2200/30; F28D 1/05366
See application file for complete search history.

(56) References Cited

U.S. PATENT DOCUMENTS

| | | | |
|---|---|---|---|
| 3,034,532 A * | 5/1962 | Sullivan | F16K 11/168 |
| | | | 137/881 |
| 6,026,804 A | 2/2000 | Schardt et al. | |
| 10,648,752 B1 * | 5/2020 | Chiang | F28F 27/02 |
| 11,073,218 B2 * | 7/2021 | Tomasko | F16K 17/16 |

(Continued)

FOREIGN PATENT DOCUMENTS

GB    2301430 A    12/1996

OTHER PUBLICATIONS

The International Search Report and the Written Opinion of International Application No. PCT/US2022/072094 dated Jan. 9, 2022.

*Primary Examiner* — P. Macade Nichols
(74) *Attorney, Agent, or Firm* — Eversheds Sutherland (US) LLP (57) ABSTRACT

The disclosed technology can include a bypass valve assembly having a partition that can fluidly separate an inlet and an outlet of a fluid heating system. A first bypass valve and a second bypass valve can be mounted to the partition and configured to permit a fluid to flow between the inlet and the outlet. The first bypass valve and the second bypass valve can be configured to transition between a closed state and an open state. The first bypass valve and the second bypass valves can each have a spring configured to transition the respective first and second bypass valve from the closed state in response to experiencing a pressure that is greater than or equal to a respective first or second predetermined pressure. The second predetermined pressure can be greater than the first predetermined pressure.

17 Claims, 9 Drawing Sheets

(56) References Cited

U.S. PATENT DOCUMENTS

| | | |
|---|---|---|
| 2014/0262200 A1* | 9/2014 | Sheppard .............. F28D 1/0333 137/637.1 |
| 2015/0260428 A1 | 9/2015 | Haldeman |
| 2021/0108827 A1 | 4/2021 | Glass et al. |

* cited by examiner

WATER HEATER BYPASS VALVES AND DEVICES THERETO

FIELD OF TECHNOLOGY

The present disclosure relates generally to water heating systems, and, more particularly, to bypass valves used to direct water to bypass a heat exchanger of a water heating system.

BACKGROUND

In water heating applications, heat exchangers are commonly used to transfer heat from combustion gases created by burning or combusting a mixture of fuel and air at a burner to water passed through heat exchanger tubes. The resultant heated water is then directed to a point of use where the heated water can be used as desired.

The flow rate at which water is passed through the heat exchanger tubes can greatly affect the performance and overall useable life of the heat exchanger. For example, if the water is passed through the heat exchanger at an insufficient flow rate, the heat exchanger tubes can become overheated and either damaged or accumulate mineral deposits within the heat exchanger tubes over time. If mineral deposits build up in the heat exchanger tubes over time, the heat exchanger can exhibit poor heat transfer and reduced flow rates. Alternatively, if water is passed through the heat exchanger at too great a flow rate, the water can be insufficiently heated and excessive condensation can accumulate on the external surface of the tubes. Thus, the flow rate of the water must be maintained within an optimal flow rate range to ensure the heat exchanger is not damaged and that the water is sufficiently heated.

To help ensure the flow rate through the heat exchanger can be maintained within an optimal flow rate range, some water heater systems include a bypass valve that is configured to open at a predetermined pressure to allow some of the water to pass from an inlet of a header to an outlet of the header so that the water bypasses the heat exchanger altogether. For example, some water heaters used for pools include a spring-loaded bypass valve that can open when the water reaches a predetermined pressure to ensure the flow rate of the water passing through the heat exchanger is maintained within an optimal range. Undesirably, however, these bypass valves are limited in their ability to manage the flow rate through the heat exchanger. For example, many water heating systems are designed with pumps that are capable of producing flow rates in excess of the bypass valve's flow capacity. In this situation, the bypass valve will reach a fully open position and be unable to accommodate the higher flow rate. In other words, the bypass valve is unable to redirect a sufficient amount of water to adequately relieve the pressure created by the higher flow rate. Because the bypass valve is unable to accommodate the higher flow rate and relieve the resultant pressure, the heat exchanger can become damaged, the water can be insufficiently heated, and condensation can build up on the external surface of the heat exchanger tube.

To accommodate flow rates that are greater than the bypass valve's upper working limit, some existing water heating systems require a pipe to be installed external to the header to route some of the water from the header inlet to the header outlet. This configuration, however, is undesirable because it can lead to greater cost and complexity in the design of the water heating system and additional leakage points.

What is needed, therefore, is a device and system for a bypass valve that is capable of accommodating both high and low flow rates without the need for an external pipe. These and other problems and be addressed by the technology disclosed herein.

SUMMARY

The disclosed technology relates generally to gas-fired water heating applications utilizing a heat exchanger, and, more particularly, to bypass valves used to direct water around a heat exchanger of a water heating system.

The disclosed technology can include a bypass valve assembly for a fluid heating system. The bypass valve assembly can include a partition configured to fluidly separate an inlet and an outlet of the fluid heating system.

The bypass valve assembly can include a first bypass valve mounted to the partition and configured to transition between (i) a closed state in which a fluid is prevented from flowing through the first bypass valve and (ii) an open state in which the fluid is permitted to flow from the inlet to the outlet through the first bypass valve. The first bypass valve can include a first spring that can be configured to transition the first bypass valve from the closed state in response to experiencing a pressure that is greater than or equal to a first predetermined pressure.

The bypass valve assembly can include a second bypass valve mounted to the partition and configured to transition between (i) a closed state in which a fluid is prevented from flowing through the second bypass valve and (ii) an open state in which the fluid is permitted to flow from the inlet to the outlet through the second bypass valve. The second bypass valve can include a second spring that can be configured to transition the second bypass valve from the closed state in response to experiencing a pressure that is greater than or equal to a second predetermined pressure. The second predetermined pressure can be greater than the first predetermined pressure.

The first spring can have a first spring rate and the second spring can have a second spring rate. The second spring rate can be greater than the first spring rate.

The first spring can have a first wire diameter and the second spring can have a second wire diameter. The second wire diameter can be greater than the first wire diameter.

The first spring can have a first outer diameter and the second spring can have a second outer diameter. The second outer diameter can be less than the first outer diameter.

The first bypass valve can have a first valve plug having a first cross-sectional area and the second bypass valve can have a second valve plug having a cross-sectional second area. The second cross-sectional area can be equal to the first cross-sectional area.

The first bypass valve can have a first valve plug having a first cross-sectional area and the second bypass valve can have a second valve plug having a second cross-sectional area. The second cross-sectional area can be less than the first cross-sectional area.

The first bypass valve can have a first valve plug having a first cross-sectional area and the second bypass valve can have a second valve plug having a second cross-sectional area. The second cross-sectional area can be greater than the cross-sectional first area.

At least one of the first spring and the second spring can be a conical spring having a first end and a second end. A diameter of the first end can be greater than a diameter of the second end. The first end can be nearest a valve plug of at least one of the first bypass valve and the second bypass valve. Alternatively, the diameter of the second end can be nearest the valve plug of at least one of the first bypass valve and the second bypass valve. At least one of the first spring and the second spring can be a barrel spring or a variable rate spring having two or more spring rates.

The first bypass valve and the second bypass valve can be concentrically aligned. If the vales are concentrically aligned, the first spring can have a first spring rate and the second spring can have a second spring rate. The second spring rate can be greater than the first spring rate. If the valves are concentrically aligned, the first bypass valve can have a first valve plug having a first cross-sectional area and the second bypass valve can have a second valve plug having a second cross-sectional area. The second cross-sectional area can be greater than or less than the first cross-sectional area.

The disclosed technology can include a header assembly for a water heating system heat exchanger. The header assembly can include an inlet, an outlet, and a partition configured to fluidly separate the inlet and the outlet.

A first bypass valve can be mounted to the partition and configured to transition between (i) a closed state in which a fluid is prevented from flowing through the first bypass valve and (ii) an open state in which the fluid is permitted to flow from the inlet to the outlet through the first bypass valve. The first bypass valve can have a first spring configured to transition the valve from the closed state in response to experiencing a pressure that is greater than or equal to a first predetermined pressure.

A second bypass valve can be mounted to the partition and configured to transition between (i) a closed state in which a fluid is prevented from flowing through the second bypass valve and (ii) an open state in which the fluid is permitted to flow from the inlet to the outlet through the second bypass valve. The second bypass valve can have a second spring configured to transition the second bypass valve from the closed state in response to experiencing a pressure that is greater than or equal to a second predetermined pressure. The second predetermined pressure can be greater than the first predetermined pressure.

The first spring can have a first spring rate and the second spring can have a second spring rate. The second spring rate can be greater than the first spring rate.

The first bypass valve can have a first valve plug having a first cross-sectional area and the second bypass valve can have a second valve plug having a second cross-sectional are. The second cross-sectional area can be less than or greater than the first cross-sectional area.

The first bypass valve and the second bypass valve can be concentrically aligned.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate various aspects of the presently disclosed subject matter and serve to explain the principles of the presently disclosed subject matter. The drawings are not intended to limit the scope of the presently disclosed subject matter in any manner.

DETAILED DESCRIPTION

The present disclosure relates generally to water heating systems, and, more particularly, to bypass valves used to cause fluid to bypass a heat exchanger of a water heating system. The disclosed technology, for example, can include a bypass valve assembly that can help regulate a flow rate of fluid passing through a heat exchanger. The bypass valve assembly, for example, can include multiple bypass valves (e.g., two or more bypass valves) with each bypass valve configured to open at a predetermined pressure. The bypass valve assembly can be integrated into a header of a water heating assembly and/or configured to replace existing bypass valve assemblies that are external to the header. Optionally, each valve can be configured to open at a different pressure. In this way, as the amount of fluid directed toward the heat exchanger increases, the bypass valve assembly can begin to sequentially open each bypass valve as the pressure increases and becomes greater than a predetermined pressure corresponding to a pressure at which each respective bypass valve will begin to open. Similarly, as the amount of fluid directed toward the heat exchanger decreases, the bypass valve assembly can begin to sequentially close each bypass valve as the pressure decreases and becomes less than each respective bypass valve's predetermined pressure. As will become apparent throughout this disclosure, the disclosed technology can provide several advantages over existing bypass valves, including regulating greater ranges of pressure and flow rates of fluid through a heat exchanger.

Although certain examples of the disclosed technology are explained in detail, it is to be understood that other examples, embodiments, and implementations of the disclosed technology are contemplated. Accordingly, it is not intended that the disclosed technology is limited in its scope to the details of construction and arrangement of components set forth in the following description or illustrated in the drawings. The disclosed technology can be implemented in a variety of examples and can be practiced or carried out in various ways. In particular, the presently disclosed subject matter is described in the context of being a bypass valve used in a header for a water heating system. The present disclosure, however, is not so limited, and can be applicable in other contexts. The present disclosure, for example and not limitation, can include other fluid systems that utilize a bypass valve whether or not that fluid system includes a heat exchanger. For example, and not limitation, the disclosed technology can be implemented in any system where fluid flow and pressure management is desirable such as industrial, commercial, residential, or other fluid plumbing, piping, or processing systems. Such implementations and applications are contemplated within the scope of the present disclosure. Accordingly, when the present disclosure is described in the context of being a bypass valve for a water heating system, it will be understood that other implementations can take the place of those referred to. Furthermore, when reference is made to water as the exemplary fluid, it will be understood that other fluids can take the place of water, including gases.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, similar components that are developed after development of the presently disclosed subject matter.

Figure 1:
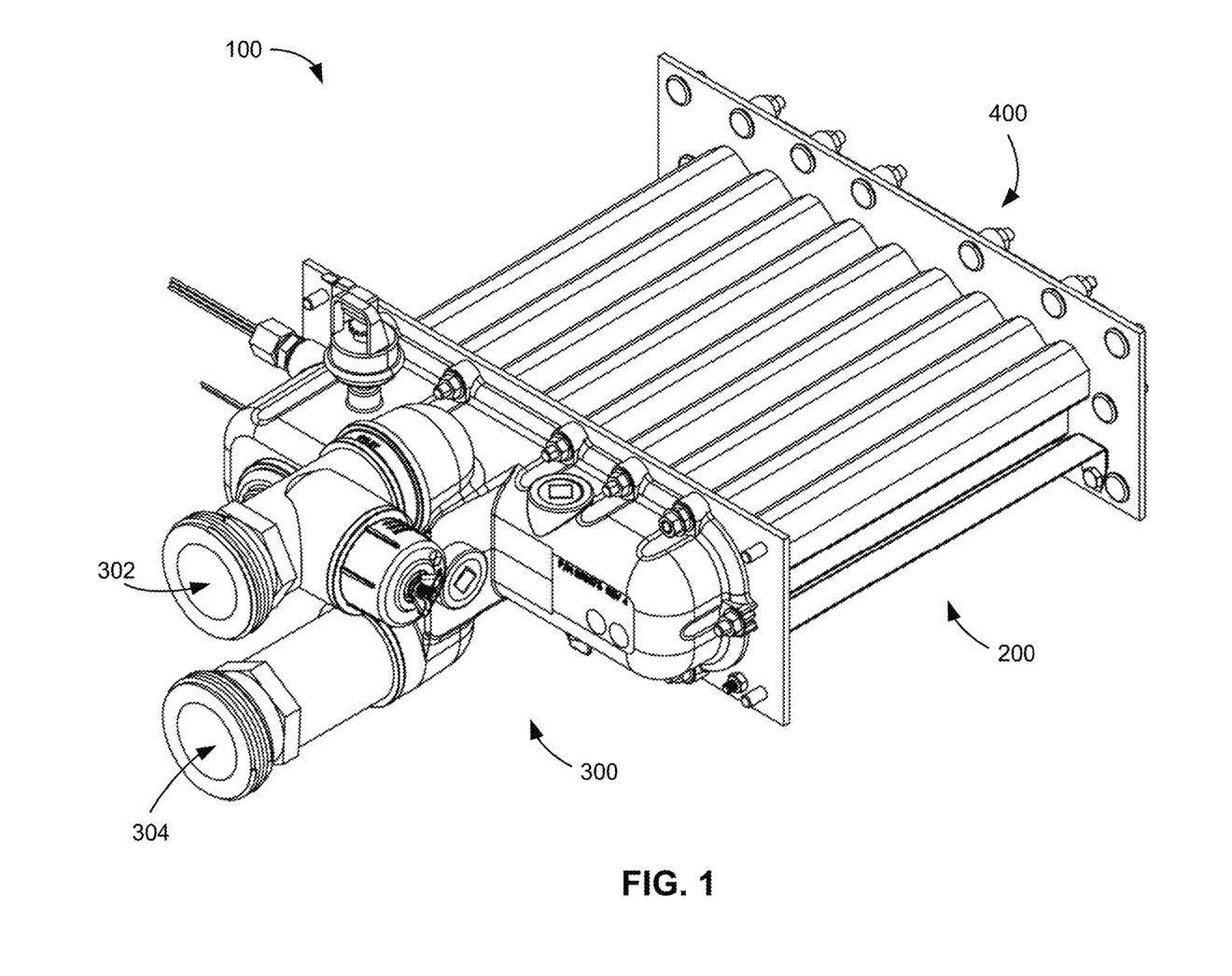
FIG. 1 illustrates an example water heating assembly having a bypass valve, in accordance with the disclosed technology.
Figure 2:
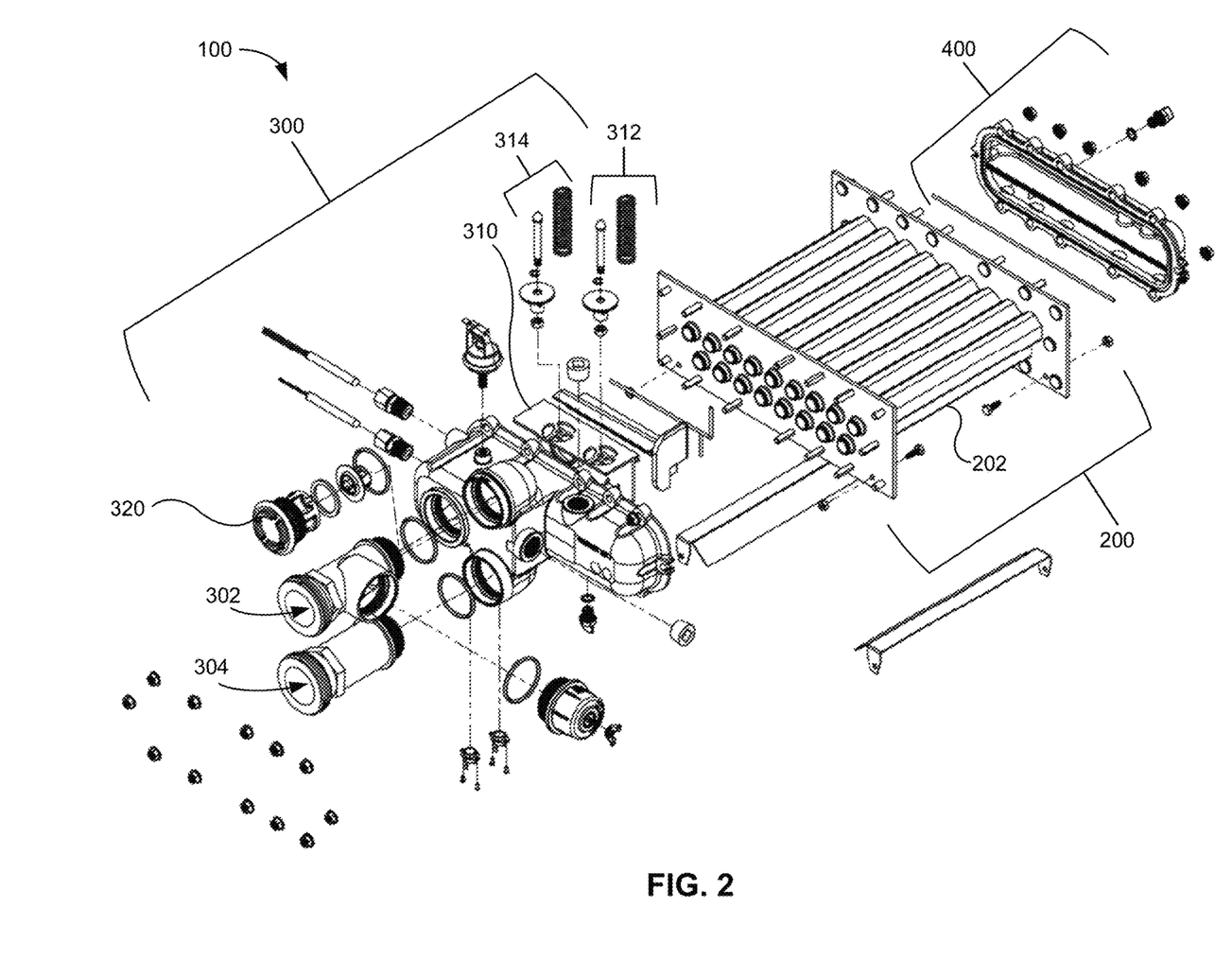
FIG. 2 illustrates an exploded view of an example water heating assembly having a bypass valve, in accordance with the disclosed technology.

Referring now to the drawings, in which like numerals represent like elements, the present disclosure is herein described. FIG. 1 illustrates a water heating assembly 100 while FIG. 2 illustrates an exploded view of the water heating assembly 100. As illustrated in FIG. 1 and FIG. 2, a water heating assembly 100 can include a heat exchanger 200, an inlet/outlet header 300, and a return header 400. The water heating assembly 100 can be configured to pass water (or another fluid) from an inlet 302 of the inlet/outlet header 300, through the heat exchanger 200, through the return header 400, back through the heat exchanger 200, and out an outlet 304 of the inlet/outlet header 300 to produce heated water.

As illustrated in FIGS. 1 and 2, and as will be described in greater detail herein, the water heating assembly 100 can be configured to pass water through the heat exchanger multiple times to help facilitate heating of the water. For example, the inlet/outlet header 300 can be configured to direct water entering the inlet 302 to a first set of heat exchanger tubes 202. The water can then pass through the first set of heat exchanger tubes 202 while being heated by combustion gases. As the water exists the heat exchanger tubes 202, the water can be redirected to a second set of heat exchanger tubes 202 by the return header 400. As before, the water can be heated by the combustion gases as the water passes through the second set of heat exchanger tubes 202. Depending on the particular configuration, the water can then be permitted to exit the inlet/outlet header 300 or the water can be directed through a third set of heat exchanger tubes 202 by the inlet/outlet header 300. If the water is directed through a third set of heat exchanger tubes 202, the return header 400 can once again redirect the water can cause it to pass through a fourth set of heat exchanger tubes 202. As will be appreciated by one of skill in the art, the inlet/outlet header 300 and the return header 400 can be configured to cause the water to pass through the heat exchanger tubes 202 any suitable number of times depending on the particular configuration. Once the water has passed through the heat exchanger tubes 202 a final time, the water can be permitted to exit the water heating assembly 100 through the exit 304.

Furthermore, as will be described in greater detail herein, the disclosed technology can include at least a first bypass valve 312 and a second bypass valve 314 that can be mounted to a bypass valve partition 310 and configured to permit fluid to flow from the inlet 302 to the outlet 304 of the inlet/outlet header 300 to bypass the heat exchanger 200 and regulate the flow rate and pressure of the water flowing through the heat exchanger 200. By including multiple bypass valves 312, 314, the design of the bypass valves 312, 314 and the inlet/outlet header 300 can be more compact than current designs. This is due, in part, because the bypass valves 312, 314 can be designed with shorter springs or springs that are able to compress to a smaller configuration such that less space is needed to facilitate permitting the fluid to flow from the inlet 302 to the outlet 304.

Although depicted throughout the figures and described herein as having two bypass valves (i.e., the bypass valve 312 and the second bypass valve 314) it should be noted that the disclosed technology can include more than two bypass valves. For example, the disclosed technology can include three, four, five, or more bypass valves as would be suitable for the particular application. For example, in systems where a wide range of pressures and flow rates can be present and a relatively narrow range of pressure and flow rate through a component (e.g., a heat exchanger 200) is desirable, having a greater number of bypass valves can help to ensure the pressure and flow rate delivered to the component can be maintained within the predetermined pressure and flow rate ranges.

Figure 3A:
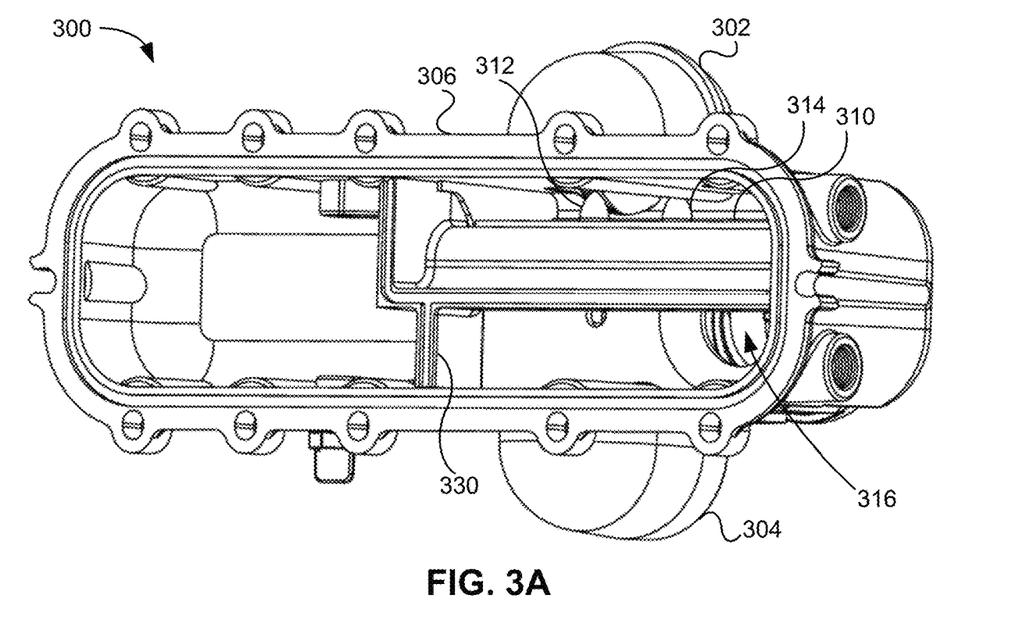
FIG. 3A illustrates an example header having a bypass valve, in accordance with the disclosed technology.
Figure 3B:
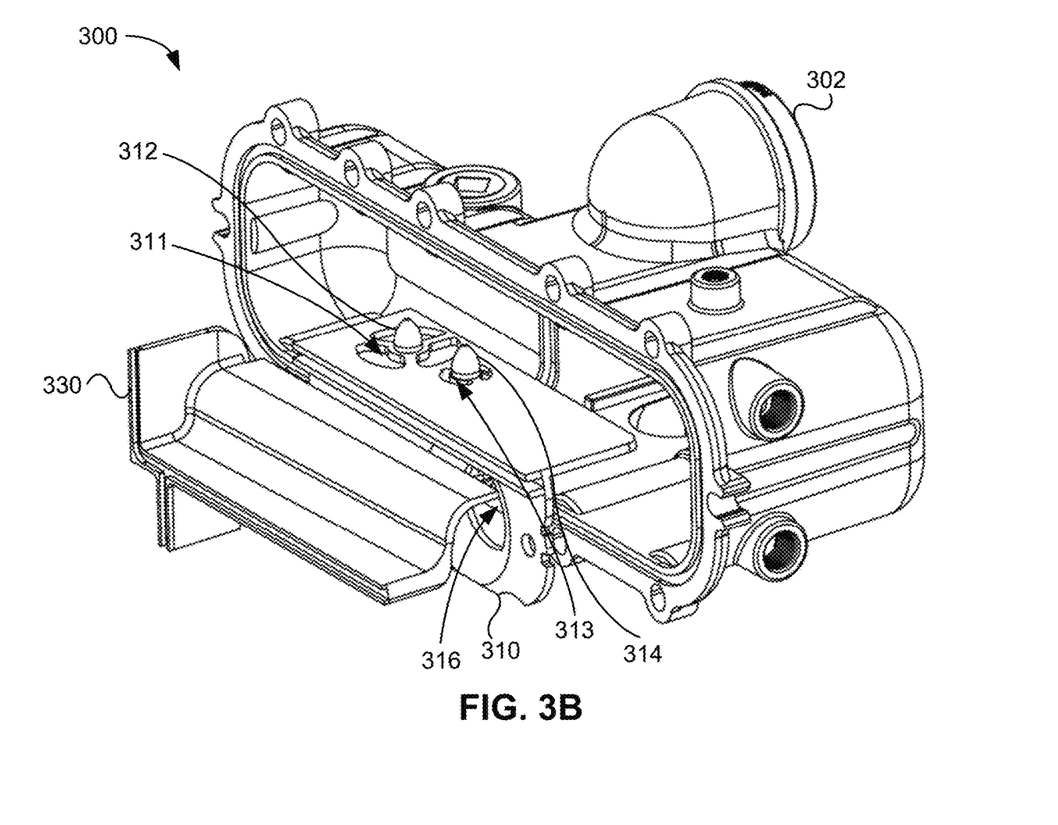
FIG. 3B illustrates an exploded view of the example header shown in FIG. 3A, in accordance with the disclosed technology.

FIGS. 3A and 3B depict an example of an inlet/outlet header 300 assembly that can be used to receive water from the inlet 302, direct the water from the inlet 302 through the heat exchanger tubes 202, receive the water from the heat exchanger tubes 202, and direct the water out the outlet 304. As will be appreciated by one of skill in the art, the inlet/outlet header 300 depicted in FIGS. 3A and 3B and described herein is offered for illustrative purposes and should not be construed as limiting the present disclosure. As illustrated in FIGS. 3A and 3B, the inlet/outlet header 300 can have an inlet/outlet header body 306 having an inlet 302 and an outlet 304. The inlet 302 can be adapted to receive water from a water source and the outlet 304 can be adapted to direct water from the inlet/outlet header 300 to a point of use. As a non-limiting example, if the water heating assembly 100 is a pool water heater, the inlet 302 can be configured to receive water circulated from the pool while the outlet 304 can be configured to direct heated water back to the pool. The water can be circulated through the water heating assembly 100 by a pump configured to move the water. As will be appreciated by those of skill in the art, the inlet/outlet header body 306 having the inlet 302 and outlet 304 on the same side of the heat exchanger can make it easier for the water heating assembly 100 to be installed in currently-existing systems and/or for the water heating assembly 100 to be serviced.

In the example depicted in FIGS. 3A and 3B, the inlet/outlet header 300 can include a bypass valve partition 310 and a second partition 330. Alternatively, the bypass valve partition 310 can be combined with the second partition 330 to form a single partition. As will be appreciated by one of skill in the art, any number of partitions can be used to fluidly separate different regions of the interior of the inlet/outlet header 300. The bypass valve partition 310 and the second partition 330 can be configured to fluidly separate the interior of the inlet/outlet header 300 so that water is directed from the inlet/outlet header 300 to the heat exchanger 200 so long as the first and second bypass valves 312, 314 remain closed. The bypass valve partition 310 can be configured to receive and support the first and second bypass valves 312, 314. The first and second bypass valve 312, 314 can be configured to selectively direct a flow of water from the inlet 302 toward the outlet 304, thereby bypassing the heat exchanger 200, depending on the conditions of the system and the desired output. For example, the first and second bypass valve 312, 314 can each be configured to open based on a pressure of the fluid to redirect the water from the inlet 302 toward the outlet 304 to help ensure the pressure in the heat exchanger 200 remains less than or equal to a threshold pressure.

The bypass valve partition 310 can have a first bypass valve aperture 311 and a second bypass valve aperture 313 that can be configured to receive and support the first and second bypass valve 312, 314 respectively. The first and second bypass valve apertures 311, 313 can be or include holes whereby water entering the inlet 302 can be directed toward the outlet 304. The first and second bypass valve apertures 311, 313 can be the same size or different sizes depending on the particular application. As a non-limiting example, the first bypass valve aperture 311 can be a larger aperture or hole to permit a greater amount of fluid to flow from the inlet 302 to the outlet 304 when the first bypass valve 312 is opened. As will be appreciated, the first and second bypass valve apertures 311, 313 can be sized to allow a sufficient amount of fluid to flow from the inlet 302 to the outlet 304 when the first and second bypass valves 312, 314 are opened to help control a flow rate of the fluid through the heat exchanger 200.

The bypass valve partition 310 can further include a governor valve aperture 316 configured to receive and support a governor valve assembly 320. The governor valve aperture 316 can be sized such that the governor valve assembly 320 can adequately restrict the flow of water flowing from the heat exchanger 200 toward the outlet 304 to help control a temperature of the water exiting the outlet 304. Furthermore, the governor valve aperture 316 can incorporate a smoothed or rounded edge to help facilitate the flow of water through the governor valve aperture 316.

Figure 4A:
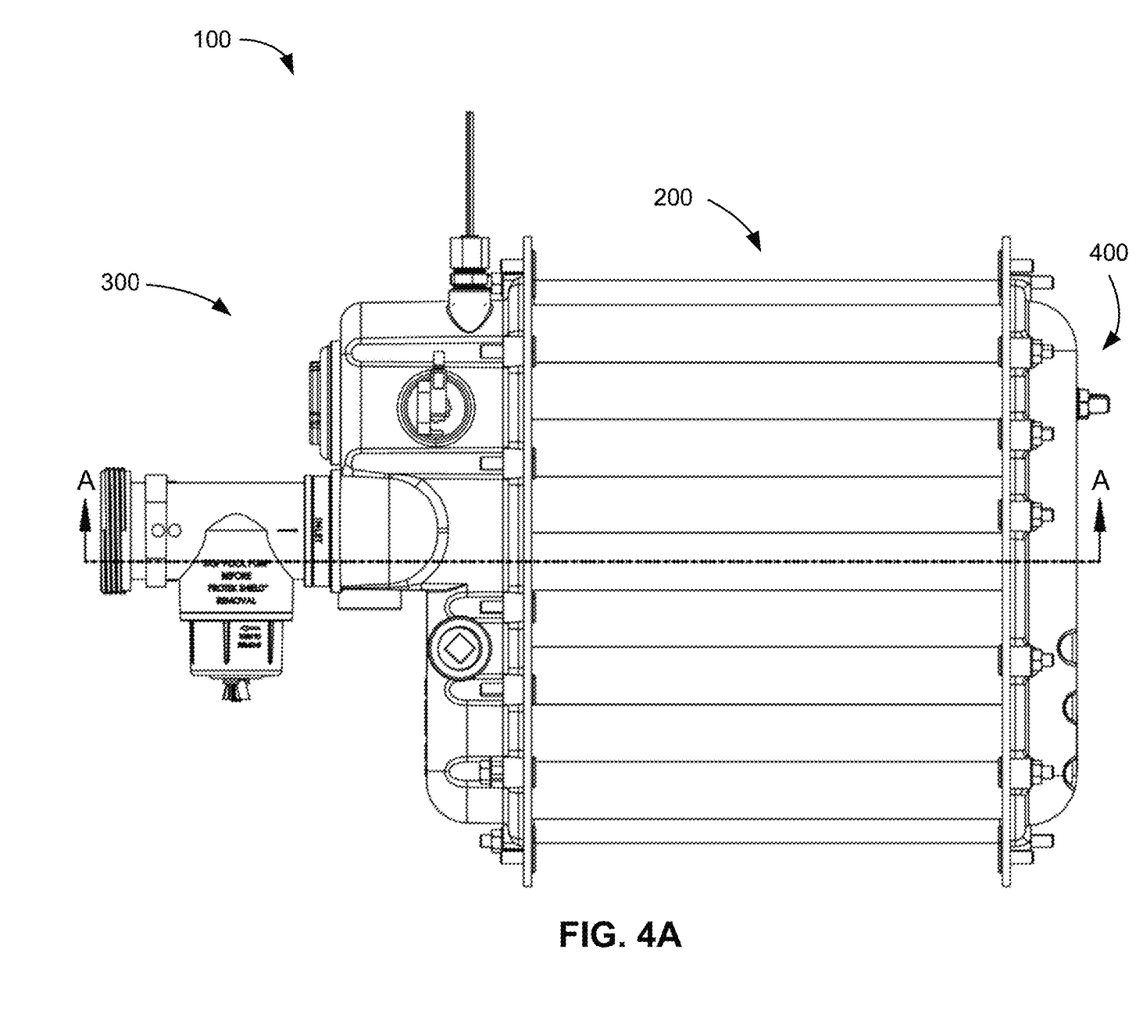
FIG. 4A illustrates a top view of an example water heating assembly having a bypass valve, in accordance with the disclosed technology.
Figure 4B:
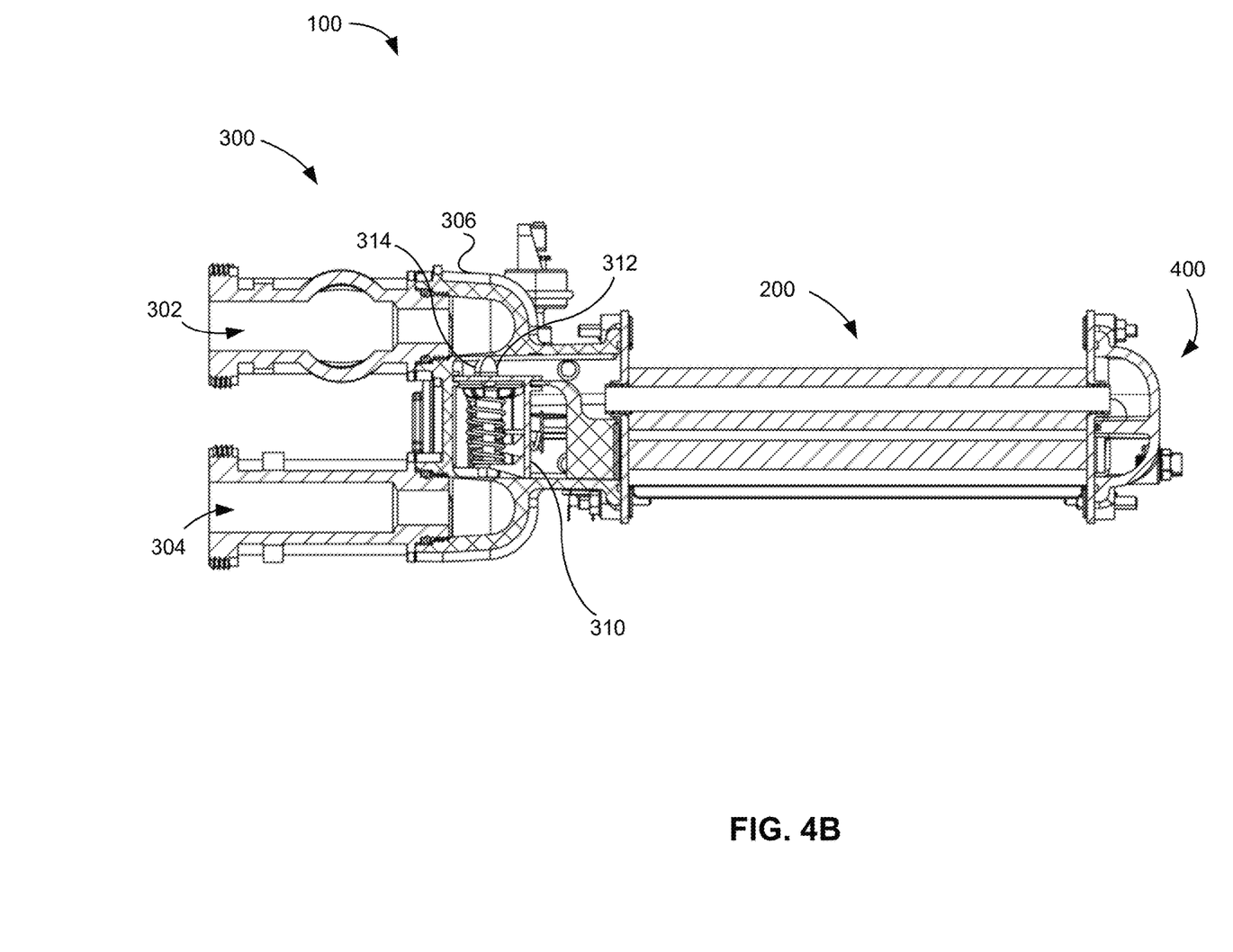
FIG. 4B illustrates a side sectional view of an example water heating assembly having a bypass valve taken along section line A-A of FIG. 4A, in accordance with the disclosed technology.
Figure 5A:
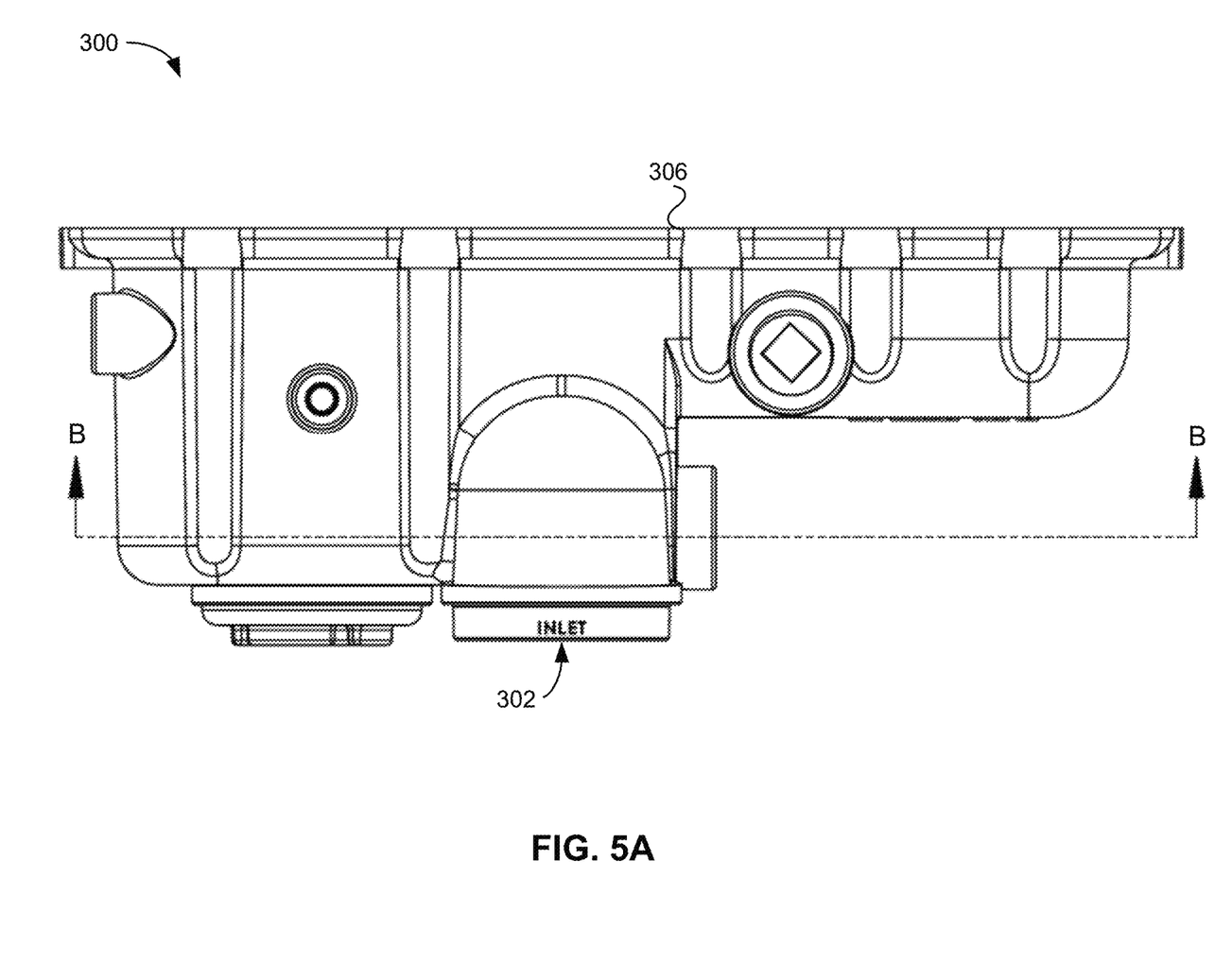
FIG. 5A illustrates a top view of an example water heating assembly having a bypass valve, in accordance with the disclosed technology.
Figure 5B:
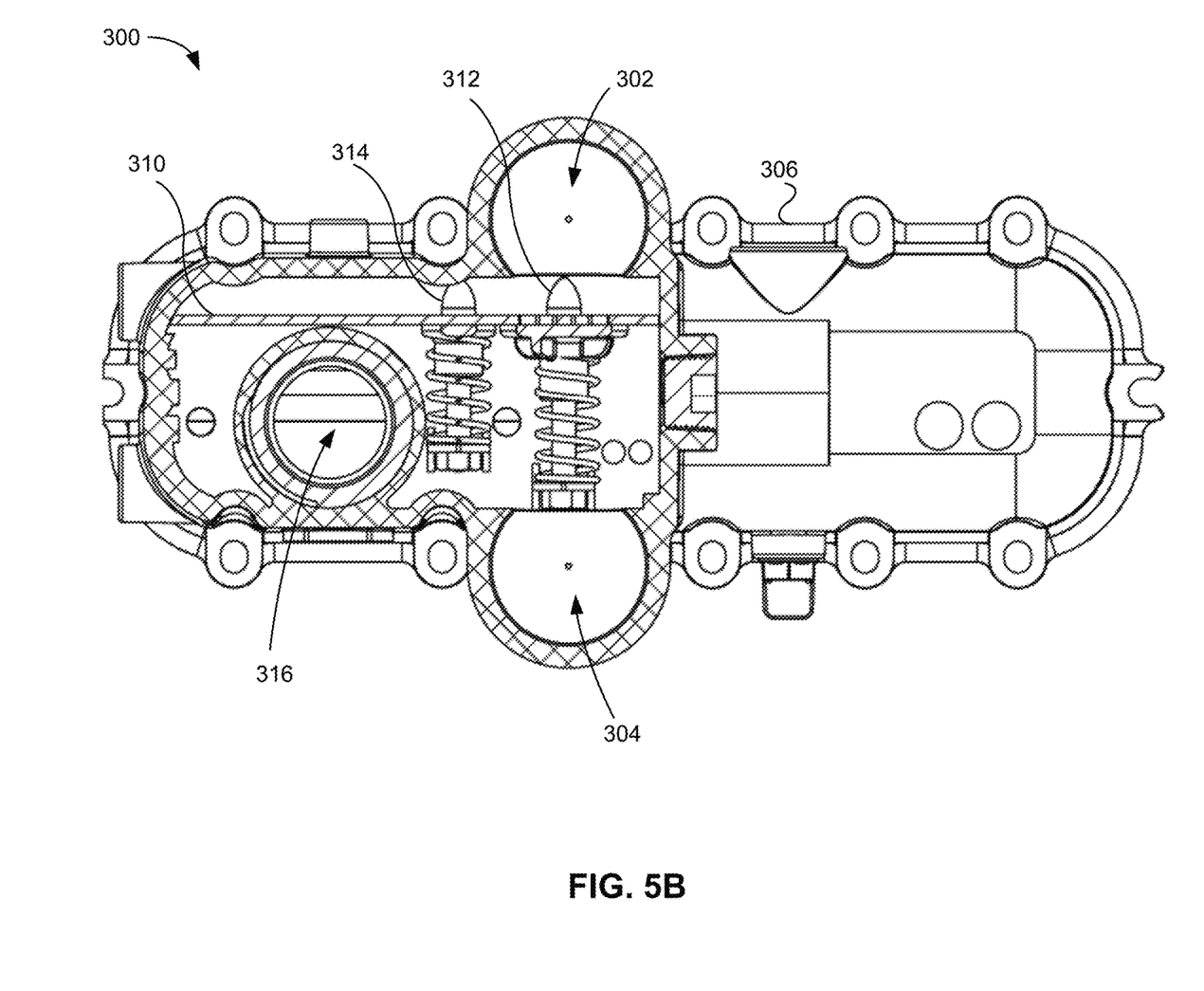
FIG. 5B illustrates a front sectional view of an example header for a water heating assembly having a bypass valve taken along section line B-B of FIG. 5A, in accordance with the disclosed technology.

As illustrated in FIGS. 4A-5B, the first bypass valve 312 and the second bypass valve 314 can be positioned in a fluid path between the inlet 302 and the outlet 304 of the inlet/outlet header 300. FIG. 4B is side cross-sectional view showing the length of the water heating assembly 100 and taken along section line A-A of FIG. 4A while FIG. 5B is a front cross-sectional view of the inlet/outlet header 300 taken along section line B-B of FIG. 5A. By positioning the first and second bypass valve 312, 314 in a fluid path between the inlet 302 and the outlet 304, the first and second bypass valve 312, 314 can permit at least a portion of the fluid to flow directly from the inlet 302 to the outlet 304 to bypass the heat exchanger 200 depending on the pressure/flow rate of the water. To illustrate, as fluid enters the inlet 302, the fluid can be directed toward the heat exchanger 200 through the header body 306 by the bypass valve partition 310 and a curved second partition 330. As long as the fluid flow rate is maintained at a flow rate that results in a pressure that is less than a first predetermined threshold pressure, the fluid will flow through the heat exchanger 200, the return header 400, back through the heat exchanger 200, and out the outlet 304.

As will be appreciated, the amount of fluid that can flow through the heat exchanger 200 is limited because of the design of the heat exchanger 200. As the flow rate of the fluid increases, the fluid will eventually begin to cause back pressure at the entrance of the heat exchanger 200 and the pressure inside of the header body 306 will increase. That is, as the flow rate increases, the pressure inside of the header body 306 near the inlet 302 will also increase. If the fluid pressure increases to a pressure that is greater than the first predetermined threshold pressure, at least the first bypass valve 312 will be opened as the fluid pressure is exerted on the first bypass valve 312. As the first bypass valve 312 opens, at least a portion of the fluid will be permitted to bypass the heat exchanger 200 and be directed to the outlet 304 thereby maintaining the fluid flow rate through the heat exchanger 200 within an acceptable flow rate range.

As the flow rate of the fluid continues to increase, the first bypass valve 312 will continue to be pushed open and the amount of fluid that is allowed to bypass the heat exchanger 200 will increase. As the flow rate of the fluid continues to increase, the first bypass valve 312 will eventually be pushed open to the point where the first bypass valve 312 reaches the extent of its travel (e.g., the first bypass valve 312 will be fully opened). If the flow rate of the fluid continues to increase after the first bypass valve 312 is fully opened, the pressure of the fluid inside of the header body 306 will eventually cause the second bypass valve 314 to open (assuming the second bypass valve 314 is configured to open at a pressure that is greater than the pressure at which the first bypass valve 312 is configured to open) and cause additional fluid (in addition to the fluid flow through the first bypass valve 312) to bypass the heat exchanger 200 and be directed toward the outlet 304. The second bypass valve 312 can be configured to open either after the first bypass valve 312 has become fully opened or before the first bypass valve 312 has become fully opened. As will be appreciated by one of skill in the art, by opening the second bypass valve 314, the flow rate of the fluid through the heat exchanger 200 can continue to be maintained within an acceptable flow rate range even if the flow rate of the water entering the inlet/outlet header 300 has increased.

If the water heating assembly 100 comprises additional bypass valves, the additional bypass valves can similarly be configured to open at predetermined flow rates and/or pressures that can be greater than, less than, or equal to the flow rates and/or pressures that cause the first and second bypass valves 312, 314 to open. As will be appreciated by one of skill in the art, the disclosed technology can provide for greater control of flow of fluid through the heat exchanger 200 when compared to existing systems by having the first and second bypass valves 312, 314 open at different pressures effectively extending the flow rate and pressure ranges that can be present in the system while still maintaining a suitable flow rate and pressure through the heat exchanger 200.

The second bypass valve 314 can be sized to permit either the same amount, a lesser amount, or a greater amount of fluid to bypass the heat exchanger when compared to the first bypass valve 312. For example, the first and second bypass valve apertures 311, 313 can have the same cross-sectional area or they can have different cross-sectional areas.

Figure 6:
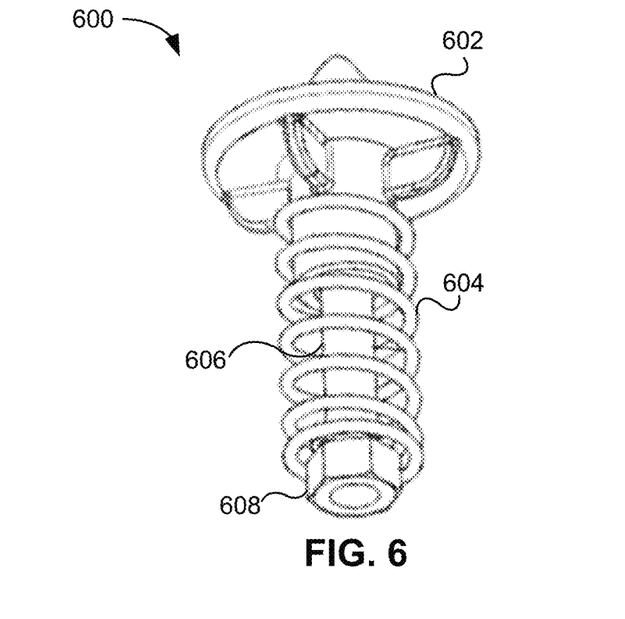
FIG. 6 illustrates a perspective view of a valve assembly of a bypass valve, in accordance with the disclosed technology.

FIG. 6 illustrates an example bypass valve 600. The bypass valve 600 depicted in FIG. 6 can be representative of the first and second bypass valves 312, 314 and can be mounted to the bypass valve partition 310 in the first and second bypass valve aperture 311, 313. The bypass valve assembly can include a valve plug 602 that is configured to create a seal at the bypass valve aperture (i.e., the first and second bypass valve apertures 311, 313) with a portion of the bypass valve partition 310 acting as a seat of the valve at the bypass valve aperture. In other words, fluid can be prevented from flowing from the inlet 302 to the outlet 304 when the bypass valve plug 602 is seated in the bypass valve aperture.

The bypass valve 600 can include a spring 604 that is configured to cause the bypass valve 600 to remain closed unless a force (i.e., the force applied by pressure of the fluid in the inlet/outlet header 300) is applied to the valve plug 602 that is greater than, and in an opposite direction of, the force applied by the spring 604. Furthermore, the bypass valve 600 can have more than one spring 604 depending on the application. The spring 604 can be mounted around a valve shaft 606 and kept in place by a lock nut 608. The valve shaft 606 can be configured to facilitate mounting the bypass valve 600 within the bypass valve aperture. The valve plug 602 can be configured to travel along the length of the valve shaft 606 to facilitate opening and closing of the bypass valve 600. As will be appreciated by one of skill in the art, the configuration of the bypass valve 600 can vary depending on the particular application. As a non-limiting example, the bypass valve 600 may have a welded end stop instead of the lock nut 608 to keep the spring 604 in place. As another example, the valve plug 602 may be affixed to the valve shaft 606 and the valve shaft 606 may be configured to slide along a mounting bracket located proximate to, or in place of, the lock nut 608.

As will be appreciated by one of skill in the art, the various components of the bypass valve 600 can be made from any suitable material for the application. For example, and not limitation, the components of the bypass valve 600 can be made from metals, including but not limited to, carbon steel, stainless steel, bronze, copper, nickel alloy, titanium, aluminum, brass, Monel®, Stellite™, Hastelloy®, or polymers, including, but not limited to, acetal polymers, polyvinyl chloride (PVC), polytetrafluoroethylene (PTFE), polyethylene (PE), polypropylene (PP), polyvinylidene fluoride (PVDF), or any other suitable material for the application.

The spring 604 can be any type of spring configured to provide a spring force to cause the bypass valve 600 to move to a closed position. For example, although the spring 604 depicted in the figures is shown as being a compression spring, the spring 604 can be a tension spring depending on the configuration. If the spring 604 is configured to be under tension, for example, the valve shaft 606 can be configured to move along with the valve plug 602 and the spring 604 can be tensioned as the bypass valve 600 is opened. In other words, the bypass valve 600 can be configured such that the spring 604 can be pulled or tensioned as the pressure pushes the valve plug 602 toward an open position.

As depicted in FIG. 6, the spring 604 can be a linear spring configured to provide a constant spring rate to the bypass valve 600. For example, the spring 604 can be a helical coil having a constant pitch (or rise angle) such that the spring 604 experiences a constant deflection per unit of force as the bypass valve 600 transitions between a closed to an open position. Such a configuration may be desirable if, for example, it is preferred to have the bypass valve 600 open linearly with respect to the amount of pressure applied to the bypass valve 600 by the fluid.

The spring 604 can be made from any suitable material for the application. As non-limiting examples, the spring 604 can be made from high-carbon steel, oil-tempered low-carbon steel, chrome silicon steel, chrome vanadium steel, stainless steel, beryllium copper alloy, phosphor bronze, titanium, rubber, urethane, one-directional glass fiber composites, or any other suitable material for the application.

Figure 7A:
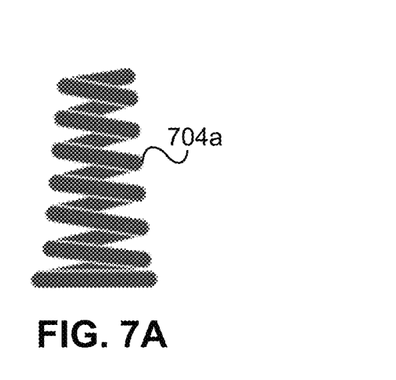
FIGS. 7A-7D illustrate example springs used in a valve assembly of a bypass valve, in accordance with the disclosed technology.
Figure 7B:
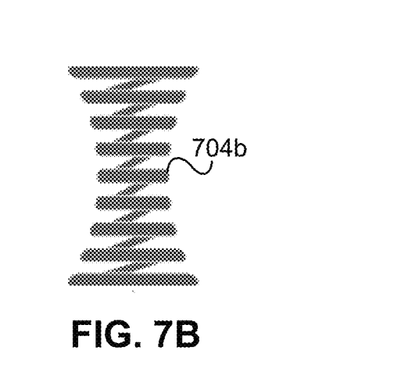
Figure 7C:
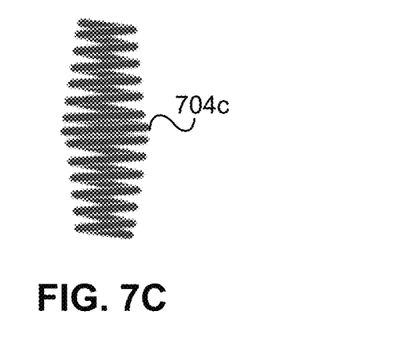
Figure 7D:
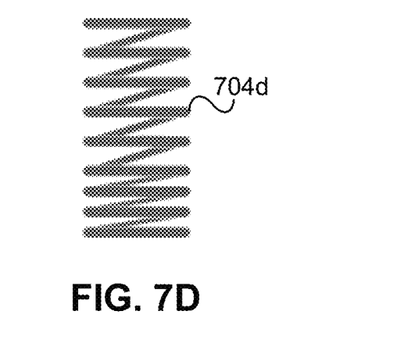

The spring 604 can also be a non-linear spring configured to provide a non-linear spring rate to the bypass valve 600 as the spring 604 is compressed or tensioned. FIGS. 7A-7D illustrate several variations of non-linear springs 704a-d that can be used to provide a non-linear spring rate to the valve plug 602. As will be appreciated, if the spring 604 is a non-linear spring (i.e., non-linear springs 704a-d), the amount of force necessary to cause the bypass valve 600 to open (i.e., the amount of pressure exerted on the first or second bypass valves 312, 314 by the fluid in the inlet/outlet header 300) will vary as the spring 604 is compressed. As non-limiting examples, the spring 604 can be a conical spring 704a as illustrated in FIG. 7A, an hourglass spring 704b as illustrated in FIG. 7B, a barrel spring 704c as illustrated in FIG. 7C, or a variable rate spring 704d as illustrated in FIG. 7D.

As will be appreciated, by using a conical spring 704a, the valve plug 602 can be permitted to travel a greater distance along the valve shaft 606 because each turn of the conical spring 704a is capable of nesting within the next largest turn of the conical spring 704a. For example, as the conical spring is compressed, the smaller end of the conical spring 704a will be pushed toward the larger end of the conical spring 704a and each turn between the smaller end and the larger end will be compressed such that the entire conical spring 704a can be the thickness of a single turn of the conical spring 704a (or the wire diameter of the conical spring 704a). Furthermore, because the conical spring 704a is capable of compressing to a smaller thickness, the overall length of the bypass valve 600 can be reduced to help facilitate a more compact design.

Similar to the conical spring 704a, the hourglass spring 704b and the barrel spring 704c can be configured to compress to a smaller thickness than a traditional spring. Unlike the conical spring 704a, however, the hourglass spring 704b and the barrel spring 704c would result in twice the thickness of the spring's wire diameter because the hourglass spring 704b and the barrel spring 704c are essentially two conical springs connected to each other.

To help ensure the first bypass valve 312 and the second bypass valve 314 can effectively control the flow of the fluid through the heat exchanger 200 across a wide range of flow rates, the first bypass valve 312 can optionally have a different spring 604 than the second bypass valve 314. As a non-limiting example, the first bypass valve 312 can have a linear spring 604 having a first compressive strength of approximately 2 lbs. while the second bypass valve 314 can have a linear spring 604 having a second compressive strength of approximately 10 lbs. As will be appreciated, in this configuration, the first bypass valve 312 will be caused to open before the second bypass valve 314. The first bypass valve 312 will also remain open as the force of the fluid pushing on the first bypass valve 312 increases greater than 2 lbs. Furthermore, the second bypass valve 314 will begin to open once the force of the fluid pushing on the second bypass valve 314 increases to greater than 10 lbs. This configuration, for example, can help to ensure the first and second bypass valves 312, 314 are capable of regulating the flow rate of the fluid through the heat exchanger during normal operation (e.g., when the force of the fluid exerted on the first and second bypass valves 312, 314 is less than 10 lbs.) and during abnormal operation (e.g., when an unnecessarily large pump is installed in the water heating assembly 100 causing the force exerted on the first and second bypass valves 312, 314 to be greater than 10 lbs.). As will be appreciated, the first and second bypass valves 312, 314 can include a spring 604 having any compressive or tensile strength as would be suitable for the particular application. For example, and not limitation, the spring 604 can have a compressive or tensile strength of 0.25 lbs., 0.5 lbs., 0.75 lbs., 1 lb., 2 lbs., 3 lbs. 4 lbs., 5 lbs., 10 lbs., 20 lbs., 50 lbs., 100 lbs., or any greater or lesser compressive or tensile strength as would be suitable for the particular application.

As another non-limiting example, the first bypass valve 312 can have a linear spring 604 while the second bypass valve 314 can have a non-linear spring (i.e., any of non-linear springs 704a-d). In this particular configuration, the first bypass valve 312 can be opened in proportion to the amount of pressure exerted on the first bypass valve 312 while the second bypass valve 314 may either progressively require a greater force per unit of travel to open as the non-linear spring 704a-d becomes compressed or progressively require less force per unit of travel to open as the non-linear spring 704a-d becomes compressed depending on the configuration. Furthermore, in other configurations the first and second bypass valve 312, 314 can both include a non-linear spring 704a-d and be configured to open at different pressures to ensure the flow rate of the fluid through the heat exchanger 200 is maintained within a predetermined flow rate range. As will be appreciated by one of skill in the art, the particular configuration of the first and second bypass valves 312, 314, including the type of spring 604 and the size of the valve plug 602, can be varied depending on the application.

Figure 8A:
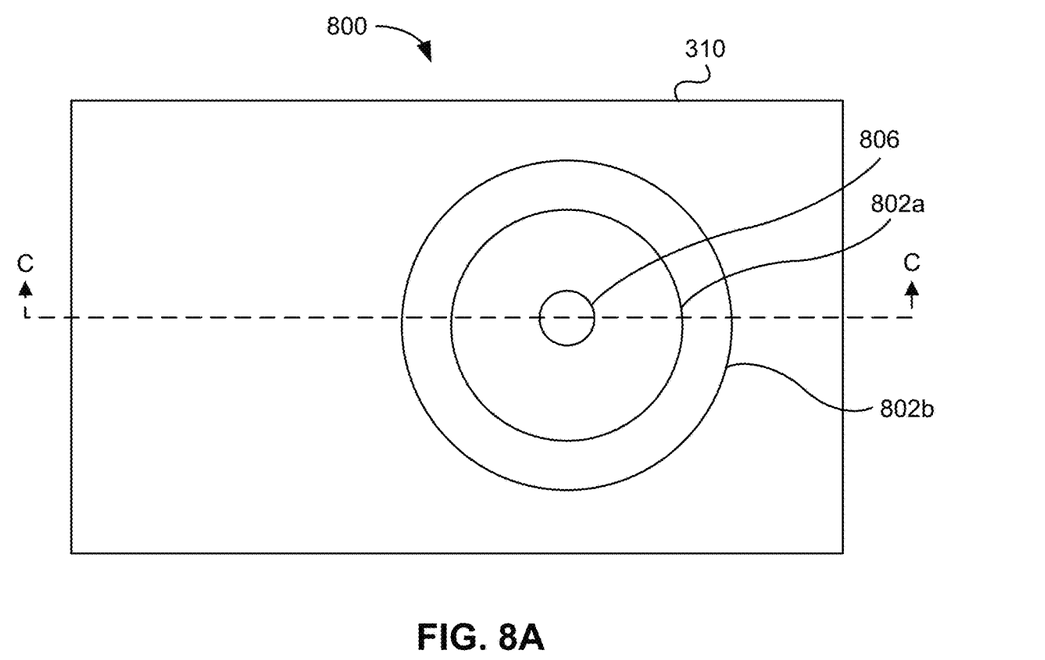
FIG. 8A illustrates a top view of a dual bypass valve assembly, in accordance with the disclosed technology.
Figure 8B:
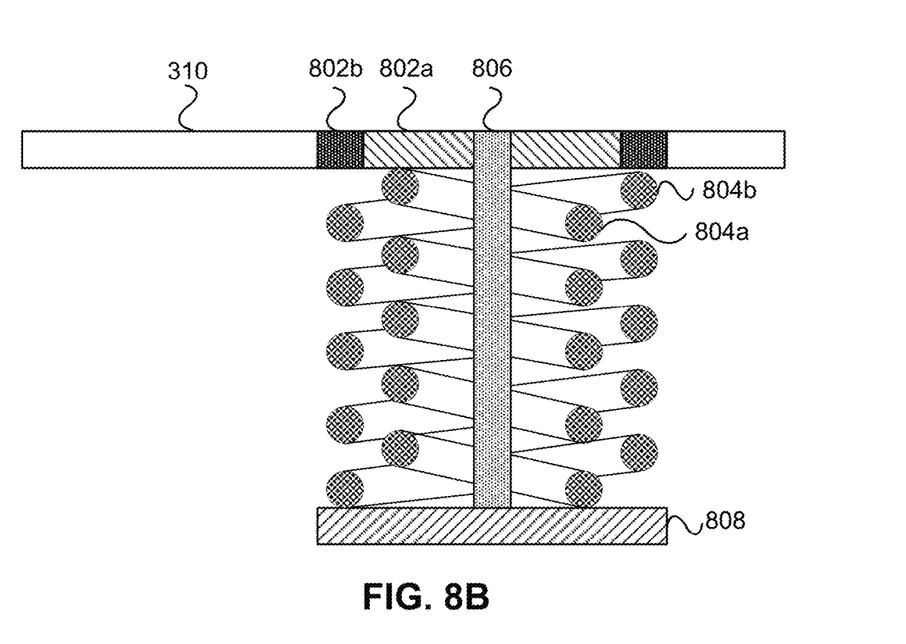
FIG. 8B illustrates a front sectional view of a dual bypass valve taken along section line C-C of FIG. 8A, in accordance with the disclosed technology.

FIGS. 8A and 8B illustrate a dual bypass valve assembly 800 having a first valve plug 802a and a second valve plug 802b concentrically mounted to a valve shaft 806 and connected to the bypass valve partition 310. The dual bypass valve assembly 800 can be configured to perform the same function as the first and second bypass valve 312, 314 herein described, however, the dual bypass valve assembly 800 can provide a more compact design. The dual bypass valve assembly 800, for example, can require a single aperture in the bypass valve partition 310 rather than the two apertures (e.g., first and second bypass valve apertures 311, 313) required by the first and second bypass valves 312, 314.

As illustrated in FIG. 8B, the first valve plug 802a can be configured to allow a lesser amount of fluid to pass from the inlet 302 to the outlet 304 by having a smaller cross-sectional area than the second valve plug 802b. For example, as the first valve plug 802a is opened under a pressure that is greater than a first predetermined pressure, only the portion of the dual bypass valve assembly 800 that includes the first valve plug 802a can be caused to open. On the other hand, as the second valve plug 802b is opened under a pressure that is greater than a second predetermined pressure, the first valve plug 802a can remain opened causing both the first and second valve plugs 802a, 802b to remain opened (due to differing spring compression values as described more fully below) and allowing a greater amount of fluid to flow from the inlet 302 to the outlet 304. As will be appreciated, in other configurations, the second valve plug 802b can be configured to open before the first valve plug 802a is opened depending on the type and strength spring used with the first and second valve plugs 802a, 802b.

The first valve plug 802a can be in contact with a first spring 804a and the second valve plug 802b can be in contact with a second spring 804b. The first and second springs 804a, 804b can be kept in place by a lock nut 808. The first spring 804a can be a spring having a first spring rate and the second spring 804b can be a spring having a second spring rate. If the first spring 804a has a spring rate that is greater than the second spring's 804b spring rate, the first spring 804a will be configured to open after the second spring 804b. Conversely, if the first spring 804a has a spring rate that is less than the second spring's 804b spring rate, the first spring 804a will be configured to open before the second spring 804b. Furthermore, as will be appreciated, the first spring 804a and the second spring 804b can be any of the types of springs described herein and comprise any compressive or tensile strength as would be suitable for the particular application. In this way, the dual bypass valve 800 can be configured to perform the same or similar function as the first and second bypass valves 312, 314 described herein.

While the present disclosure has been described in connection with a plurality of example aspects, as illustrated in the various figures and discussed above, it is understood that other similar aspects can be used, or modifications and additions can be made to the described subject matter for performing the same function of the present disclosure without deviating therefrom. In this disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims. Moreover, various aspects of the disclosed technology have been described herein as relating to methods, systems, devices, and/or non-transitory, computer-readable medium storing instructions. However, it is to be understood that the disclosed technology is not necessarily limited to the examples and embodiments expressly described herein. That is, certain aspects of a described system can be included in the methods described herein, various aspects of a described method can be included in a system described herein, and the like.

What is claimed is:

1. A bypass valve assembly for a fluid heating system, the bypass valve assembly comprising:
    a partition configured to fluidly separate an inlet and an outlet of the fluid heating system;
    a first bypass valve mounted to the partition and configured to transition between (i) a closed state in which a fluid is prevented from flowing through the first bypass valve and (ii) an open state in which the fluid is permitted to flow from the inlet to the outlet through the first bypass valve, the first bypass valve having a first spring configured to transition the first bypass valve from the closed state in response to experiencing a pressure that is greater than or equal to a first predetermined pressure; and
    a second bypass valve mounted to the partition and configured to transition between (i) a closed state in which a fluid is prevented from flowing through the second bypass valve and (ii) an open state in which the fluid is permitted to flow from the inlet to the outlet through the second bypass valve, the second bypass valve having a second spring configured to transition the second bypass valve from the closed state in response to experiencing a pressure that is greater than or equal to a second predetermined pressure, the second predetermined pressure being greater than the first predetermined pressure,
    wherein the first spring comprises a first spring rate and the second spring comprises a second spring rate, the second spring rate being greater than the first spring rate.

2. The bypass valve assembly of claim 1, wherein the first spring comprises a first wire diameter and the second spring comprises a second wire diameter, the second wire diameter being greater than the first wire diameter.

3. The bypass valve assembly of claim 1, wherein the first spring comprises a first outer diameter and the second spring comprises a second outer diameter, the second outer diameter being less than the first outer diameter.

4. The bypass valve assembly of claim 1, wherein the first bypass valve comprises a first valve plug having a first cross-sectional area and the second bypass valve comprises a second valve plug having a cross-sectional second area, the second cross-sectional area being equal to the first cross-sectional area.

5. The bypass valve assembly of claim 1, wherein the first bypass valve comprises a first valve plug having a first cross-sectional area and the second bypass valve comprises a second valve plug having a second cross-sectional area, the second cross-sectional area being less than the first cross-sectional area.

6. The bypass valve assembly of claim 1, wherein the first bypass valve comprises a first valve plug having a first cross-sectional area and the second bypass valve comprises a second valve plug having a second cross-sectional area, the second cross-sectional area being greater than the cross-sectional first area.

7. The bypass valve assembly of claim 1, wherein at least one of the first spring and the second spring comprises a conical spring having a first end and a second end, wherein a diameter of the first end is greater than a diameter of the second end, the first end being nearest a valve plug of at least one of the first bypass valve and the second bypass valve.

8. The bypass valve assembly of claim 1, wherein at least one of the first spring and the second spring comprises a conical spring having a first end and a second end, wherein a diameter of the first end is greater than a diameter of the second end, the second end being nearest a valve plug of at least one of the first bypass valve and the second bypass valve.

9. The bypass valve assembly of claim 1, wherein at least one of the first spring and the second spring comprises a barrel spring.

10. The bypass valve assembly of claim 1, wherein at least one of the first spring and the second spring comprises a variable rate spring having two or more spring rates.

11. The bypass valve assembly of claim 1, wherein the first bypass valve and the second bypass valve are concentrically aligned.

12. The bypass valve assembly of claim 11, wherein the first bypass valve comprises a first valve plug having a first cross-sectional area and the second bypass valve comprises a second valve plug having a second cross-sectional area, the second cross-sectional area being less than the first cross-sectional area.

13. The bypass valve assembly of claim 11, wherein the first bypass valve comprises a first valve plug having a first cross-sectional area and the second bypass valve comprises a second valve plug having a second cross-sectional area, the second cross-sectional area being greater than the first cross-sectional area.

14. A bypass valve assembly for a fluid heating system, the bypass valve assembly comprising:
    a partition configured to fluidly separate an inlet and an outlet of the fluid heating system;
    a first bypass valve mounted to the partition and configured to transition between (i) a closed state in which a fluid is prevented from flowing through the first bypass valve and (ii) an open state in which the fluid is permitted to flow from the inlet to the outlet through the first bypass valve, the first bypass valve having a first spring configured to transition the first bypass valve from the closed state in response to experiencing a pressure that is greater than or equal to a first predetermined pressure; and
    a second bypass valve mounted to the partition and configured to transition between (i) a closed state in which a fluid is prevented from flowing through the second bypass valve and (ii) an open state in which the fluid is permitted to flow from the inlet to the outlet through the second bypass valve, the second bypass valve having a second spring configured to transition the second bypass valve from the closed state in response to experiencing a pressure that is greater than or equal to a second predetermined pressure, the second predetermined pressure being greater than the first predetermined pressure,
    wherein the first bypass valve comprises a first valve plug having a first cross-sectional area and the second bypass valve comprises a second valve plug having a second cross-sectional area, the second cross-sectional area being less than the first cross-sectional area.

15. A bypass valve assembly for a fluid heating system, the bypass valve assembly comprising:
    a partition configured to fluidly separate an inlet and an outlet of the fluid heating system;

a first bypass valve mounted to the partition and configured to transition between (i) a closed state in which a fluid is prevented from flowing through the first bypass valve and (ii) an open state in which the fluid is permitted to flow from the inlet to the outlet through the first bypass valve, the first bypass valve having a first spring configured to transition the first bypass valve from the closed state in response to experiencing a pressure that is greater than or equal to a first predetermined pressure; and a second bypass valve mounted to the partition and configured to transition between (i) a closed state in which a fluid is prevented from flowing through the second bypass valve and (ii) an open state in which the fluid is permitted to flow from the inlet to the outlet through the second bypass valve, the second bypass valve having a second spring configured to transition the second bypass valve from the closed state in response to experiencing a pressure that is greater than or equal to a second predetermined pressure, the second predetermined pressure being greater than the first predetermined pressure, wherein the first bypass valve comprises a first valve plug having a first cross-sectional area and the second bypass valve comprises a second valve plug having a second cross-sectional area, the second cross-sectional area being greater than the cross-sectional first area.

16. A bypass valve assembly for a fluid heating system, the bypass valve assembly comprising:

a partition configured to fluidly separate an inlet and an outlet of the fluid heating system;

a first bypass valve mounted to the partition and configured to transition between (i) a closed state in which a fluid is prevented from flowing through the first bypass valve and (ii) an open state in which the fluid is permitted to flow from the inlet to the outlet through the first bypass valve, the first bypass valve having a first spring configured to transition the first bypass valve from the closed state in response to experiencing a pressure that is greater than or equal to a first predetermined pressure; and a second bypass valve mounted to the partition and configured to transition between (i) a closed state in which a fluid is prevented from flowing through the second bypass valve and (ii) an open state in which the fluid is permitted to flow from the inlet to the outlet through the second bypass valve, the second bypass valve having a second spring configured to transition the second bypass valve from the closed state in response to experiencing a pressure that is greater than or equal to a second predetermined pressure, the second predetermined pressure being greater than the first predetermined pressure, wherein at least one of the first spring and the second spring comprises a variable rate spring having two or more spring rates.

17. A bypass valve assembly for a fluid heating system, the bypass valve assembly comprising:

a partition configured to fluidly separate an inlet and an outlet of the fluid heating system;

a first bypass valve mounted to the partition and configured to transition between (i) a closed state in which a fluid is prevented from flowing through the first bypass valve and (ii) an open state in which the fluid is permitted to flow from the inlet to the outlet through the first bypass valve, the first bypass valve having a first spring configured to transition the first bypass valve from the closed state in response to experiencing a pressure that is greater than or equal to a first predetermined pressure; and a second bypass valve mounted to the partition and configured to transition between (i) a closed state in which a fluid is prevented from flowing through the second bypass valve and (ii) an open state in which the fluid is permitted to flow from the inlet to the outlet through the second bypass valve, the second bypass valve having a second spring configured to transition the second bypass valve from the closed state in response to experiencing a pressure that is greater than or equal to a second predetermined pressure, the second predetermined pressure being greater than the first predetermined pressure, wherein the first bypass valve and the second bypass valve are concentrically aligned, and wherein the first spring comprises a first spring rate and the second spring comprises a second spring rate, the second spring rate being greater than the first spring rate.

* * * * *